United States Patent
Pillai et al.

(10) Patent No.: US 10,340,543 B2
(45) Date of Patent: Jul. 2, 2019

(54) SYSTEMS AND METHODS FOR SUPPRESSING CHROMIUM POISONING IN FUEL CELLS

(71) Applicant: Bloom Energy Corporation, Sunnyvale, CA (US)

(72) Inventors: Manoj Pillai, Sunnyvale, CA (US); James Wilson, San Francisco, CA (US); Tad Armstrong, Burlingame, CA (US); Chung-Dee Pong, Sunnyvale, CA (US); James Chang, Sunnyvale, CA (US); Matthias Gottmann, Sunnyvale, CA (US); Tulin Akin, Sunnyvale, CA (US)

(73) Assignee: Bloom Energy Corporation, San Jose, CA (US)

( * ) Notice: Subject to any disclaimer, the term of this patent is extended or adjusted under 35 U.S.C. 154(b) by 618 days.

(21) Appl. No.: 13/971,064

(22) Filed: Aug. 20, 2013

(65) Prior Publication Data

US 2014/0057184 A1 Feb. 27, 2014

Related U.S. Application Data

(60) Provisional application No. 61/691,360, filed on Aug. 21, 2012, provisional application No. 61/788,661, filed on Mar. 15, 2013.

(51) Int. Cl.
*H01M 8/04* (2016.01)
*H01M 8/24* (2016.01)
(Continued)

(52) U.S. Cl.
CPC ....... *H01M 8/0662* (2013.01); *H01M 8/0258* (2013.01); *H01M 8/04089* (2013.01);
(Continued)

(58) Field of Classification Search
CPC ... H01M 8/0662; H01M 8/04089; H01M 8/24
See application file for complete search history.

(56) References Cited

U.S. PATENT DOCUMENTS 8,163,434 B2 * 4/2012 Kebbede ............. C23C 18/1216
427/115
2007/0237999 A1 * 10/2007 Donahue ............... C04B 35/645
429/465

(Continued)

FOREIGN PATENT DOCUMENTS

| JP | 2009-152016 A | * | 7/2009 | .............. H01M 8/02 |
| JP | 2009-152016 A | | 7/2009 | |
| JP | 2010033747 A | | 2/2010 | |

OTHER PUBLICATIONS

International search report and written opinion received in connection with International Application No. PCT/US2013/055765, dated Nov. 8, 2013.

(Continued)

*Primary Examiner* — Jonathan Crepeau
*Assistant Examiner* — Angela Martin
(74) *Attorney, Agent, or Firm* — The Marbury Law Group, PLLC

(57) ABSTRACT

A fuel cell assembly includes a fuel cell stack including a plurality of fuel cells, an incoming oxidizing gas flow path configured to deliver an oxidizing gas to the plurality of fuel cells, and a chromium-getter material located in the incoming oxidizing flow path. A fuel cell includes an electrolyte, a cathode electrode on a first side of the electrolyte, an anode electrode on a second side of the electrolyte, and a chromium-getter material on the cathode electrode.

10 Claims, 16 Drawing Sheets

(51) Int. Cl.
*H01M 8/06* (2016.01)
*H01M 8/0662* (2016.01)
*H01M 8/2425* (2016.01)
*H01M 8/0258* (2016.01)
*H01M 8/2484* (2016.01)
*H01M 8/04089* (2016.01)

(52) U.S. Cl.
CPC ....... *H01M 8/2425* (2013.01); *H01M 8/2484* (2016.02); *H01M 8/24* (2013.01)

(56) References Cited

U.S. PATENT DOCUMENTS

| | | | |
|---|---|---|---|
| 2008/0026262 A1* | 1/2008 | Kim | C25F 1/00 429/432 |
| 2009/0155666 A1* | 6/2009 | Kiefer | H01M 8/0206 429/513 |
| 2009/0155667 A1 | 6/2009 | Kiefer | |
| 2009/0162729 A1 | 6/2009 | Kiefer | |
| 2010/0119886 A1* | 5/2010 | Nielsen | H01M 8/0217 429/465 |
| 2012/0225370 A1* | 9/2012 | Kim | H01M 8/1004 429/482 |
| 2013/0230644 A1* | 9/2013 | Armstrong | H01M 8/0245 427/115 |
| 2013/0256122 A1* | 10/2013 | Ramanathan | H01M 4/9066 204/252 |
| 2016/0072143 A1* | 3/2016 | Singh | H01M 8/0687 429/410 |

OTHER PUBLICATIONS

International Preliminary Report on Patentability received in connection with International Application No. PCT/US2013/055765, dated Mar. 5, 2015.

Office Action from the ROC (Taiwan) Intellectual Property Office for ROC (Taiwan) Patent Application No. 102130094, dated Jul. 4, 2017, with English-language Search Report, 7 pages.

Office Action from the ROC (Taiwan) Intellectual Property Office for ROC (Taiwan) Patent Application No. 102130094, dated Mar. 9, 2017, with English-language Search Report, 8 pages.

Office Communication from the Intellectual Property Office for ROC (Taiwan) Patent Application No. 102130094, dated Apr. 10, 2018, with English-language translation, 8 pages.

\* cited by examiner

SYSTEMS AND METHODS FOR SUPPRESSING CHROMIUM POISONING IN FUEL CELLS

CROSS-REFERENCE TO RELATED PATENT APPLICATIONS

The present application claims the benefit of U.S. Provisional Patent Application No. 61/691,360 entitled "Systems and Methods for Suppressing Chromium Poisoning in Fuel Cells" filed Aug. 21, 2012 and U.S. Provisional Patent Application No. 61/788,661 entitled "Systems and Methods for Suppressing Chromium Poisoning in Fuel Cells" filed Mar. 15, 2013. The entire contents of both provisional applications are incorporated herein by reference.

FIELD

The present invention is directed to electrochemical systems and methods of using the same.

BACKGROUND

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel and air has to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

SUMMARY

The various embodiments include a chromium getter including a substrate having at least one gas flow passage in, on or through the substrate, and a chromium-getter material coated on the substrate inside the at least one gas flow passage.

Further embodiments include a fuel cell including an electrolyte, a cathode electrode on a first side of the electrolyte, an anode electrode on a second side of the electrolyte, and a chromium-getter material on the cathode electrode.

Further embodiments include a fuel cell assembly including a fuel cell stack including a plurality of fuel cells, an incoming oxidizing gas flow path configured to deliver an oxidizing gas to the plurality of fuel cells, and a chromium-getter material located in the incoming oxidizing flow path.

Further embodiments include a method of operating a fuel cell assembly including flowing an incoming oxidizing gas stream past a chromium-getter material to cathode electrodes of the fuel cell assembly such that chromium from the oxidizing gas stream deposits on the chromium-getter material.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Alloys containing high amounts of chromium (Cr) are typically used in SOFC systems, both as balance of plant and interconnect materials, because they form protective chromia shells at high temperature that prevent spallation. Unfortunately, at these high temperatures, and especially in wet air environments, the chromia layer evaporates Cr, most notably in the form of $CrO_2(OH)_2$. It is well documented that this Cr vapor poisons SOFC cathodes to reduce the operating life of the SOFC system. To help prevent this, the interconnect surface in contact with air may be coated with an oxide layer to suppress Cr evaporation from the interconnects. While these coatings may be very effective, they fail to block all of the Cr evaporating from the interconnect and therefore do not fully prevent Cr poisoning. Additionally, Cr poisoning may also occur due to balance of plant components (e.g., air flow pipes, etc.) contaminating the oxidant stream (e.g., air) that flows over the cathode.

Various embodiments provide chromium (Cr) getters that may be placed in the incoming oxidizing flow path (i.e., the path of oxidizing gas, such as air, from a source, such as a reserve tank or the atmosphere, to the fuel cell, such as via various balance of plant components (e.g., pumps), manifolds, and gas flow passages). The Cr getters may remove Cr from the oxidizing flow to prevent Cr poisoning of the cathode electrode 3. For example, Cr from the incoming oxidizing flow may be deposited as Cr containing crystals on the surface of the Cr getter.

Figure 1:
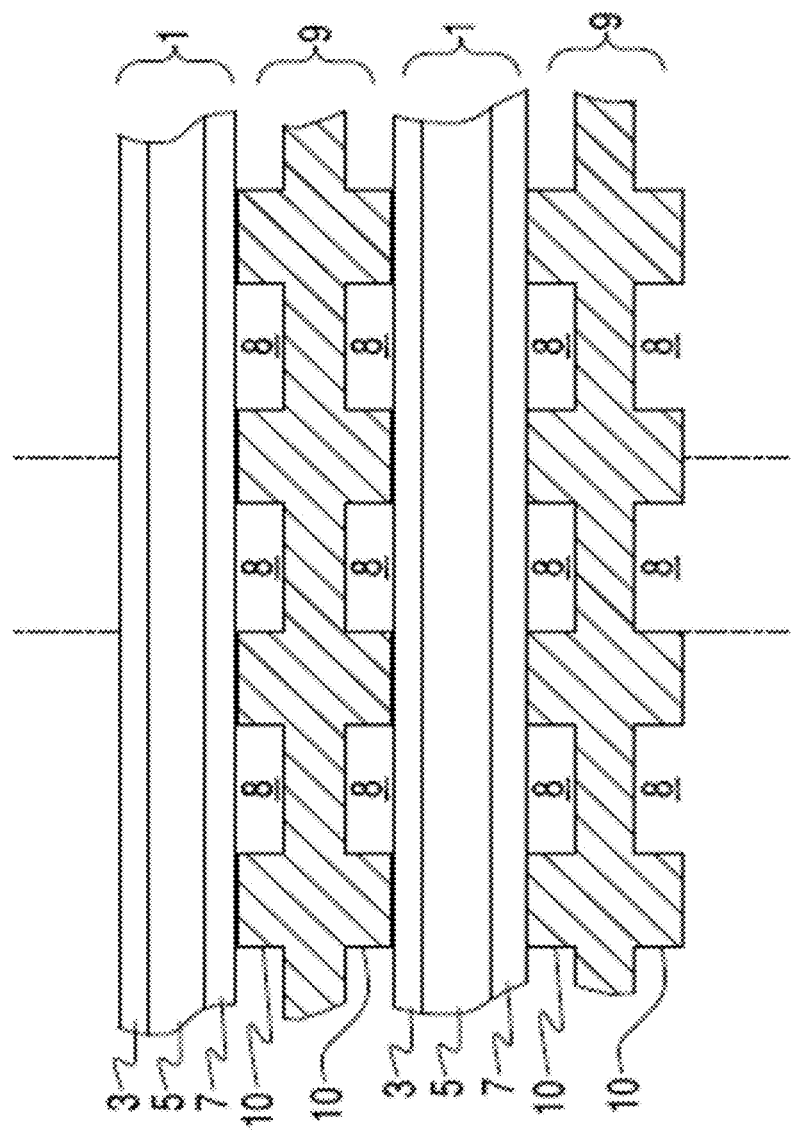
FIG. 1 illustrates a cross-sectional view of a SOFC stack.

FIG. 1 illustrates a solid oxide fuel cell (SOFC) stack in which each SOFC 1 comprises a cathode electrode 3 (e.g., LSM or other conductive perovskites), a solid oxide electrolyte 5 (e.g., YSZ, SSZ, or doped ceria), and an anode electrode 7 (e.g., a cermet such as a nickel-stabilized zirconia and/or doped ceria cermet).

Various materials may be used for the cathode electrode 3, electrolyte 5, and anode electrode 7. For example, the anode electrode may comprise a cermet comprising a nickel containing phase and a ceramic phase. The nickel containing phase may consist entirely of nickel in a reduced state. This phase may form nickel oxide when it is in an oxidized state. Thus, the anode electrode is preferably annealed in a reducing atmosphere prior to operation to reduce the nickel oxide to nickel. The nickel containing phase may include other metals in additional to nickel and/or nickel alloys. The ceramic phase may comprise a stabilized zirconia, such as yttria and/or scandia stabilized zirconia and/or a doped ceria, such as gadolinia, yttria and/or samaria doped ceria.

The electrolyte may comprise a stabilized zirconia, such as scandia stabilized zirconia (SSZ) or yttria stabilized zirconia (YSZ). Alternatively, the electrolyte may comprise another ionically conductive material, such as a doped ceria.

The cathode electrode may comprise an electrically conductive material, such as an electrically conductive perovskite material, such as lanthanum strontium manganite (LSM). Other conductive perovskites, such as LSCo, etc., or metals, such as Pt, may also be used. The cathode electrode may also contain a ceramic phase similar to the anode electrode. The electrodes and the electrolyte may each comprise one or more sublayers of one or more of the above described materials.

Fuel cell stacks are frequently built from a multiplicity of SOFC's 1 in the form of planar elements, tubes, or other geometries. Although the fuel cell stack in FIG. 1 is vertically oriented, fuel cell stacks may be oriented horizontally or in any other direction. Fuel and air may be provided to the electrochemically active surface, which can be large.

The gas flow separator 9 (referred to as a gas flow separator plate when part of a planar stack), containing gas flow passages or channels 8 between ribs 10, separates the individual cells in the stack. The gas flow separator plate separates fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack, there may be an air end plate or fuel end plate (not shown) for providing air or fuel, respectively, to the end electrode.

Frequently, the gas flow separator plate 9 is also used as an interconnect which electrically connects the anode or fuel electrode 7 of one cell to the cathode or air electrode 3 of the adjacent cell. In this case, the gas flow separator plate which functions as an interconnect is made of or contains electrically conductive material. FIG. 1 shows that the lower SOFC 1 is located between two interconnects 9.

Interconnects may be made of or may contain electrically conductive material, such as a metal alloy (e.g., chromium-iron alloy) which has a similar coefficient of thermal expansion to that of the solid oxide electrolyte in the cells (e.g., a difference of 0-10%). An electrically conductive contact layer, such as a nickel contact layer, may be provided between the anode electrode and the interconnect. Another optional electrically conductive contact layer may be provided between the cathode electrode and the interconnect.

The plurality of fuel cells in a fuel cell stack may share a common fuel inlet and exhaust passages or risers. A fuel cell stack may include a distinct electrical entity which contains two end plates on opposite ends of the stack which are connected to power conditioning equipment and the power (i.e., electricity) output of the stack. Thus, in some configurations, the electrical power output from such a distinct electrical entity may be controlled separately from other stacks. In other embodiments, multiple stacks may share the same end plates. In this case, the stacks may jointly comprise a distinct electrical entity.

A fuel cell stack may be part of a larger fuel cell system for generating power. The fuel cell stack may be located in a hot zone within such a system. During normal operation, this hot zone may operate at a high temperature, such as a temperature of about 600° C. or more, e.g., 600-1000° C., such as 750-950° C.

Figure 2:
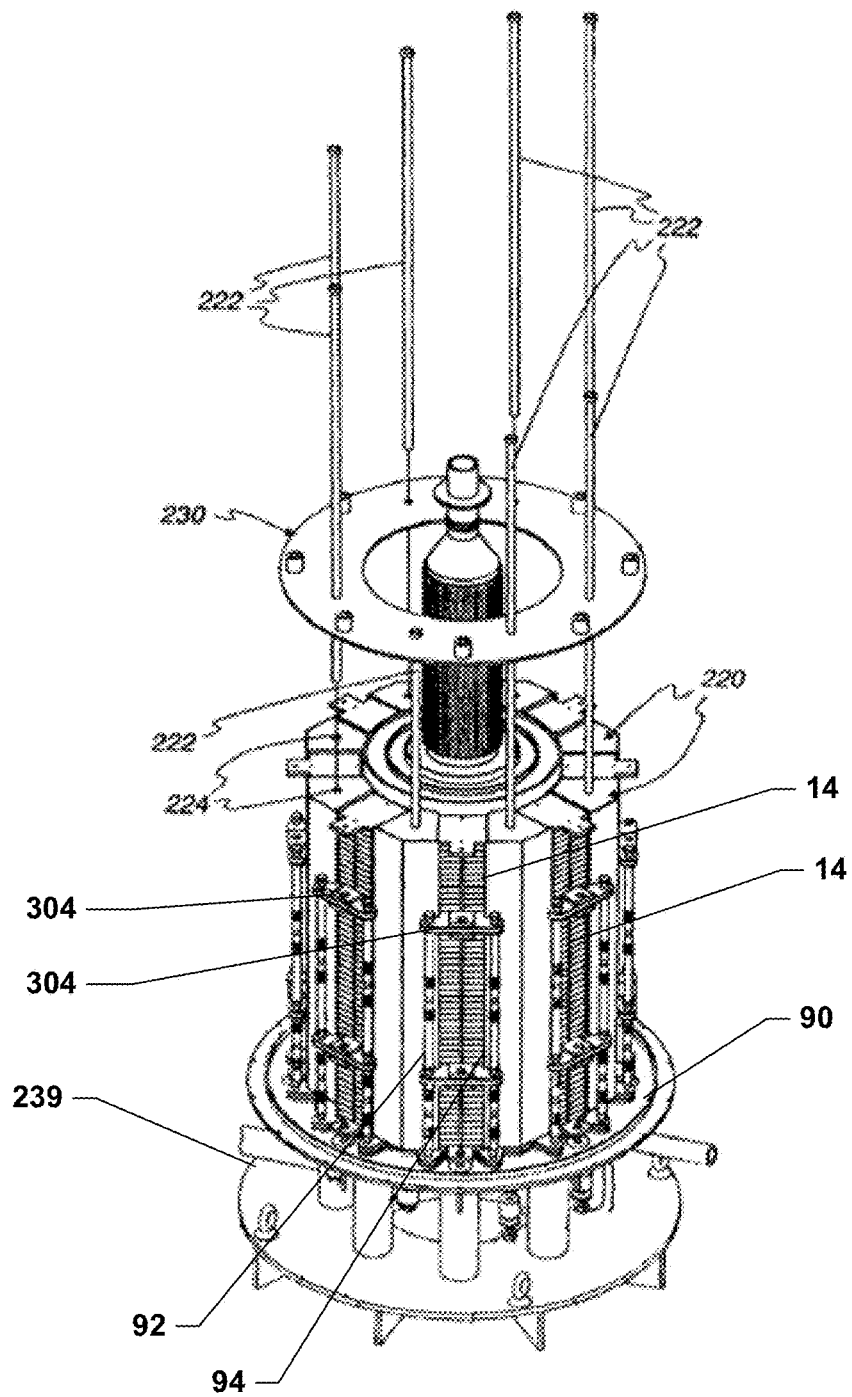
FIG. 2 illustrates a three dimensional cut-away view of a prior art fuel cell assembly.

FIG. 2 illustrates an example fuel cell system in which the solid oxide fuel cell (SOFC) stacks 14 are located on a base. Each stack 14 may comprise a collection of fuel cells 1 and interconnects 9. Wedge shaped ceramic side baffles 220 (e.g., having a non-uniform thickness and a roughly triangular cross sectional shape in the horizontal direction) are located between adjacent fuel cell stacks 14 (or columns of fuel cell stacks). The baffles 220 serve to direct the cathode feed into the cathode flow paths and to fill the space between adjacent stacks so that the cathode feed passes through each of the stacks 14, rather than bypassing around the longitudinal sides of the stacks 14. The baffles 220 are held in place by tie rods 222 that pass through closely fitting bores 224 centrally located in each of the baffles 220. Preferably, the baffles 220 are electrically non-conductive and made as one unitary piece from a suitable ceramic material. FIG. 2 also shows fuel distribution manifolds 304 between the stacks in the stack column and fuel inlet and exhaust conduits 92, 94 connected to the manifolds.

In this prior art system, the SOFC stacks maintain a compressive load. The compressive load is maintained by upper pressure plate 230, tie rods 222, lower pressure plate 90 and a compression spring assembly located below the lower pressure plate 90. The compression spring assembly applies a load directly to the lower pressure plate 90 and to the upper pressure plate 230 via the tie rods 222.

In an alternative embodiment, the load is transmitted through the base 239 as this is the only zero datum of the system. Penetrations or feed-throughs through the base 239 are used in order to pull the required load from the base 239.

Figure 3:
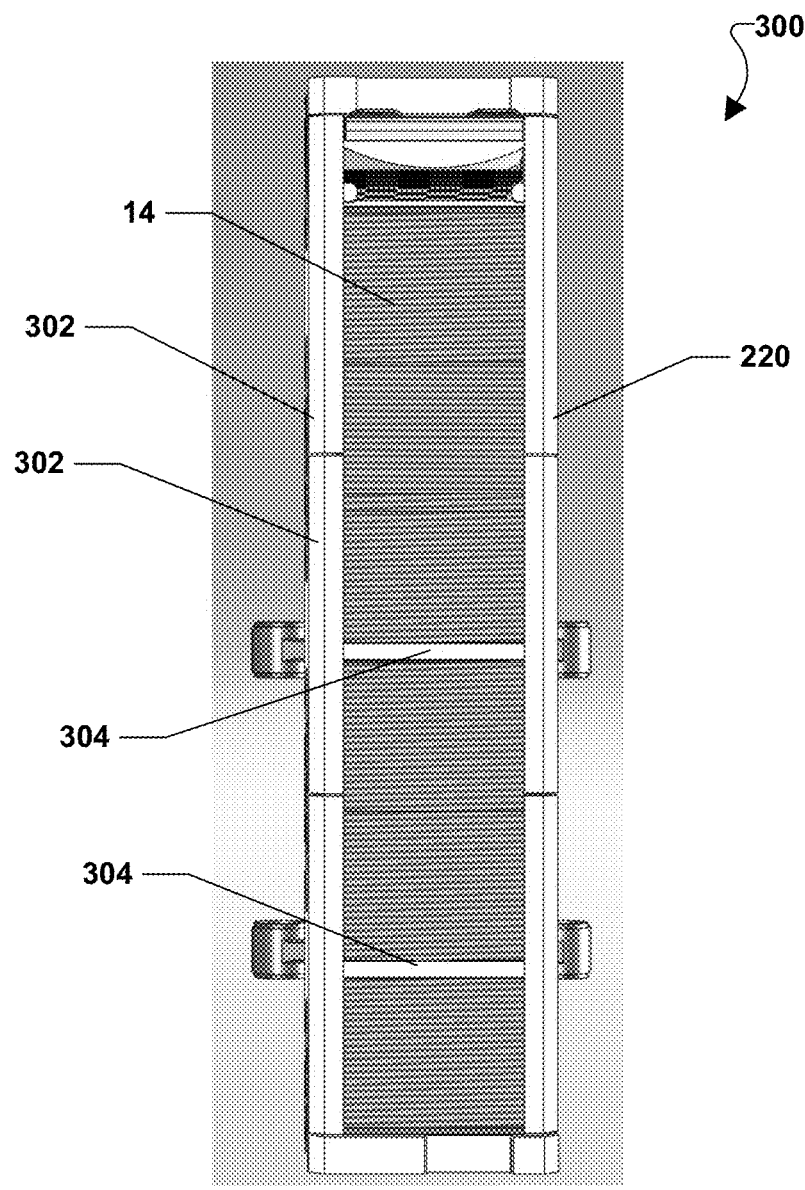
FIG. 3 illustrates a side view of an embodiment of a column of fuel cell stacks with plate shaped side baffles.

FIG. 3 illustrates an alternative prior art system with two side baffles 220 placed on opposite sides of the column containing one or more fuel cell stacks 14. However, more or less side baffles 220 may be used for stacks having a cross sectional shape other than rectangular. Further, one or more fuel manifolds 304 may be provided in the column of fuel cell stacks 14. An exemplary fuel manifold is described in the U.S. application Ser. No. 11/656,563, which is incorporated by reference in its entirety. Any number of fuel manifolds 304 may be provided between adjacent fuel cell stacks 14 as desired. Further, the number of fuel cell stacks 14 in a column of fuel cell stacks 14 may be selected as desired and is not limited to the number of fuel cell stacks 14 illustrated in FIG. 3.

The side baffles 220 may be used to place a compressive load on the fuel cell stack(s) 14 (or column(s) of stacks). This embodiment eliminates feed-throughs and tie rod heat sinks and uses the same part (i.e., side baffle 220) for two purposes: to place the load on the stacks 14 and to direct the cathode feed flow stream (e.g., for a ring shaped arrangement of stacks shown in FIG. 2, the cathode inlet stream, such as air or another oxidizer may be provided from a manifold outside the ring shaped arrangement through the stacks and the exit as a cathode exhaust stream to a manifold located inside the ring shaped arrangement). The side baffles 220 may also electrically isolate the fuel cell stacks 14 (or a column of stacks 14) from metal components in the system. The load on the stacks may be provided from any one or more load sources, such as the base 239 of the system, a block underneath the stack 14 or column of stacks, a spring assembly above the stack 14, etc.

Preferably, the ceramic side baffles 220 have a plate shape rather than wedge shape and are made from plate shaped pieces or features (e.g., baffle plates 302) rather than comprising a unitary ceramic piece. Plate shaped baffles and plates preferably have two major surfaces and one or more (e.g., four) edge surfaces. In an embodiment, one or more edge surfaces may have an area at least 5 times smaller than the major surface area. Alternatively, one or more edge surfaces may have an area at least 4 times or 3 times smaller than the major surface area. Preferably, the plates have a constant width or thickness, have a substantially rectangular shape when viewed from the side of the major surface, and have a cross sectional shape which is substantially rectangular. In an alternative embodiment, the ceramic side baffles 220 are not rectangular but may have a wedge shaped cross section. That is, one of the edge surfaces may be wider than the opposing edge surface. The baffles 220 may completely fill the space between adjacent electrode stacks 14, or alternatively, the side baffles 220 may be configured so that there is space between side baffles 220. In other words, the side baffles 220 may not completely fill the space between adjacent fuel cell stacks 14. Preferably, the baffle plates 302 are made from a high temperature material, such as alumina or other suitable ceramic. In an embodiment, the baffle plates 302 are made from a ceramic matrix composite (CMC). The CMC may include, for example, a matrix of aluminum oxide (e.g., alumina), zirconium oxide or silicon carbide. Other matrix materials may be selected as well. The fibers may be made from alumina, carbon, silicon carbide, or any other suitable material. Any combination of the matrix and fibers may be used. Additionally, the fibers may be coated with an interfacial layer designed to improve the fatigue properties of the CMC. If desired, the CMC baffles may be made from a unitary piece of CMC material rather than from individual interlocking baffle plates. The CMC material may increase the baffle strength and creep resistance. If the baffles are made from alumina or an alumina fiber/alumina matrix CMC, then this material is a relatively good thermal conductor at typical SOFC operating temperatures (e.g., above 700° C.). If thermal decoupling of neighboring stacks or columns is desired, then the baffles can be made of a thermally insulating ceramic or CMC material.

Figure 4:
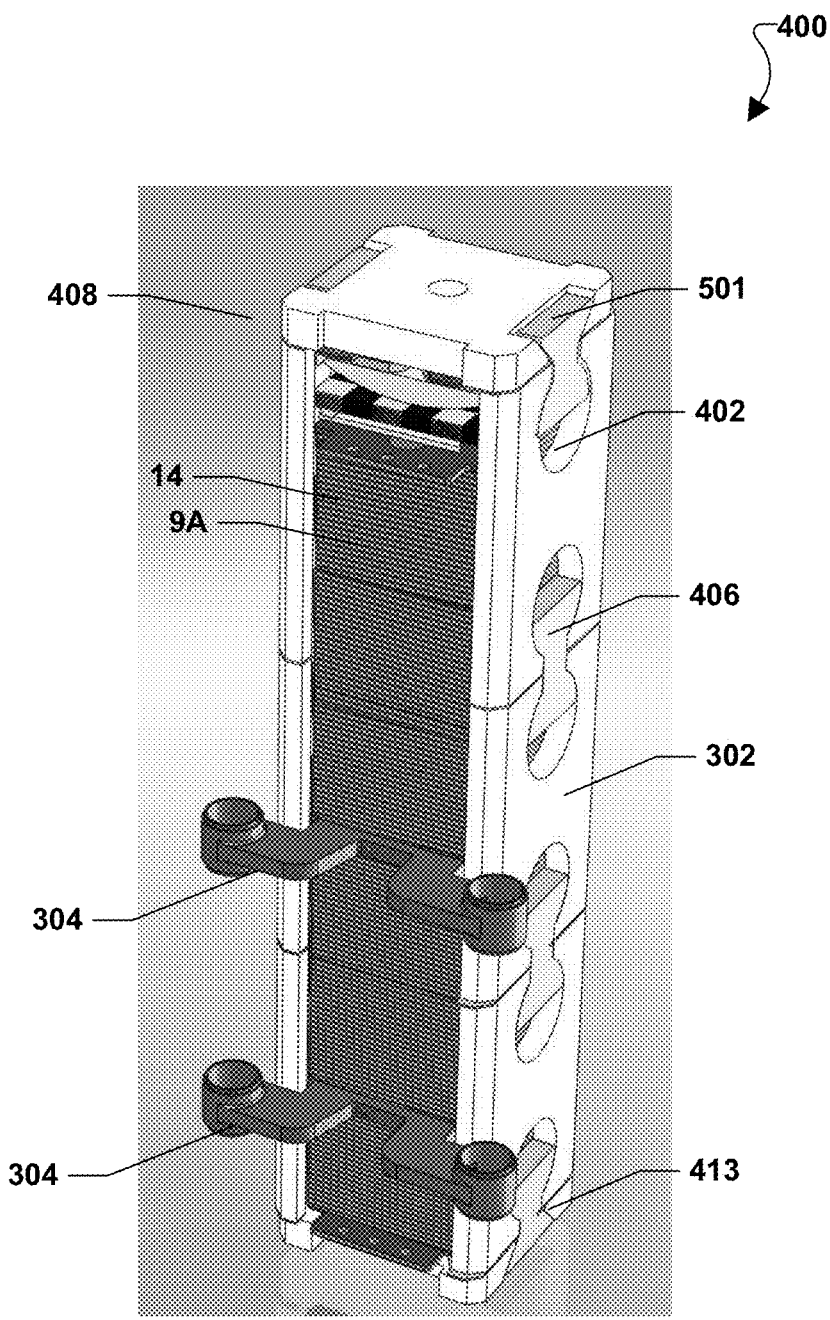
FIG. 4 illustrates a three dimensional view of an embodiment of plate shaped side baffles with dovetail connections and non-space filling bow tie/dog bone connectors.

In alternatives embodiment, ceramic inserts 406 may be used to connect the baffle plates 202. For example, FIG. 4 illustrates a system with inserts 406 that do not completely fill circular or quasi-circular cutouts 402 in the baffle plates 302. The inserts 406 may have a generally bow tie shape, but include flat edges 501 rather than fully rounded edges. Thus, empty space may remain in the respective cutouts 402 above or below the inserts 406.

In various embodiments, spring compression assembly 408 may be included between the baffle plates 302 and fuel cell stacks 14. For example, the spring compression assembly 408 may be above one or more stacks 14, as shown in FIG. 4.

The baffle plates 302 may be attached to the base 239 of the system using an insert 406. Alternately, FIG. 4 shows a column of stacks 14 attached to a linkage block 413 located below the column rather than being attached directly to the system base 239. The load on the column is provided from the linkage block 413 to create a "cage" around the column. For example, the linkage block 413 may comprise a ceramic material, such as alumina or CMC, which is separately attached (e.g., by the inserts, dovetails or other implements) to the ceramic baffles and to the system base 239. The use of the ceramic block material minimizes creation of heat sinks and eliminates the problem of linking the ceramic baffles to a metal base which introduces thermal expansion interface problems.

As noted above, the embodiments include Cr getters in one or more locations along the incoming air flow path. In preferred embodiments, the Cr getter may be placed where the oxidant flow temperature exceeds 500° C. Preferred embodiments may include a Cr getter as close to the SOFC stack as possible in order to maximize the amount of Cr that can be captured before the air enters the fuel cell stack. Examples of locations include the leading edge of the interconnects or the front face of the fuel cell stack, balance of plant components before the stacks, or a separate component added specifically for this purpose which can have air flow around it or through it, such as a porous foam or network.

Figure 5A:
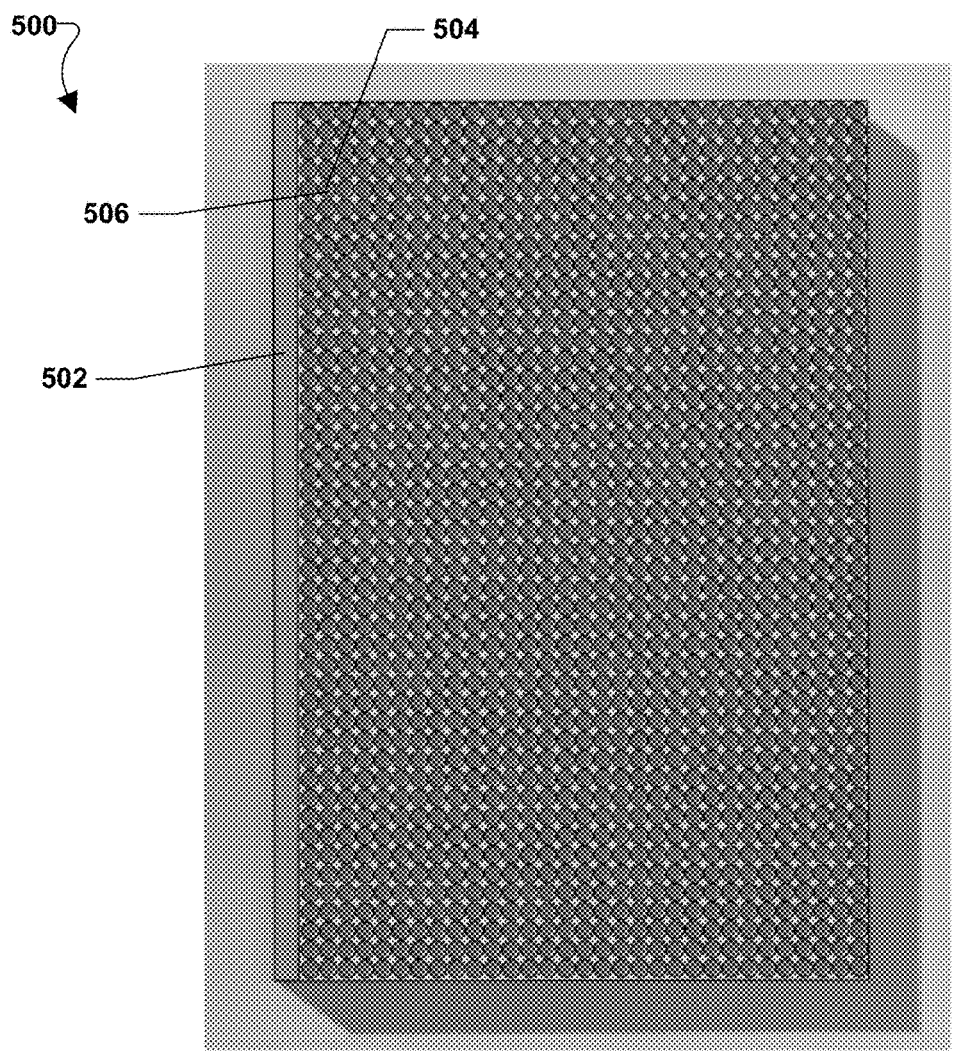
FIGS. 5A-E illustrate alternate geometries of various embodiments chromium getters.

In various embodiments, a Cr getter may comprise a layer of chromium-getter material. For example, a Cr getter may comprise a substrate shaped to define at least one gas flow passage coated with chromium-getter material. FIG. 5A illustrates a Cr getter 500 which includes a substrate 502 shaped to define multiple gas flow passages 504 in a honeycomb configuration (i.e., parallel gas flow passages running straight through the substrate). The substrate may comprise various materials, such as materials chosen to match the thermal expansion properties of fuel cell assembly (e.g., inert ceramic materials, such as zirconia, alumina, silica, or more complex ceramic materials such as cordierite). The surface of the substrate 502 may be coated with chromium-getter material 506 (which will described in more detail below) inside the gas flow passages 504. The Cr getter 500 may be incorporated into a fuel cell stack such that oxidizing flow (e.g., air) is routed through the gas flow passages 504 to encounter the getter material 506 prior to reaching the cathode electrodes 3.

Figure 5C:
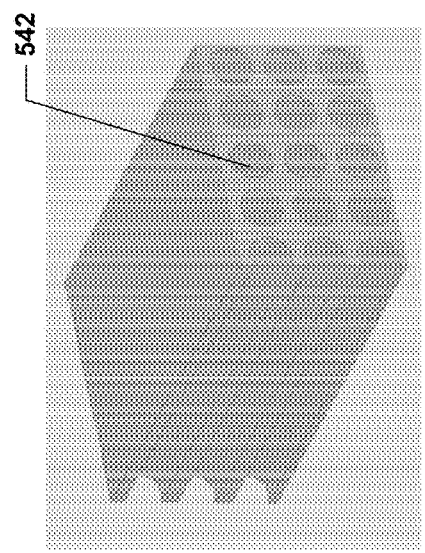
Figure 5E:
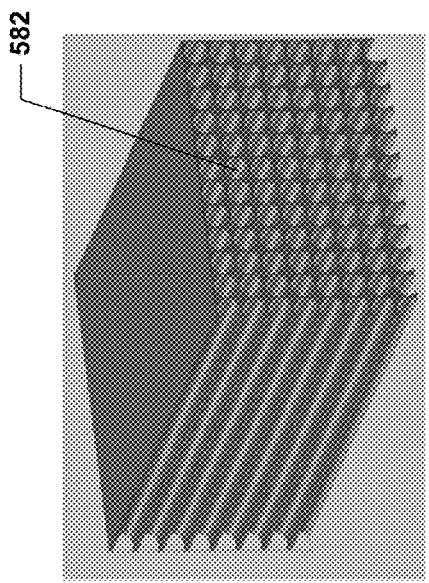
Figure 5B:
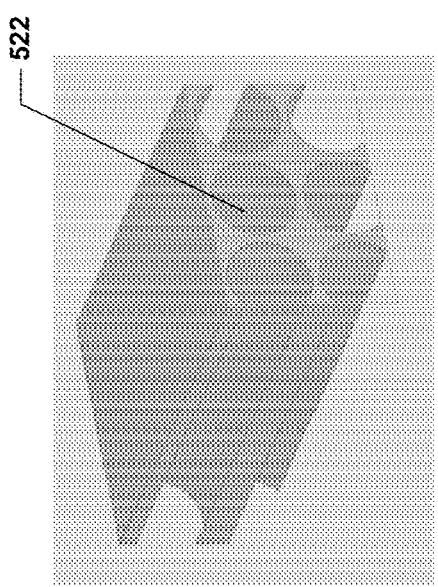
Figure 5D:
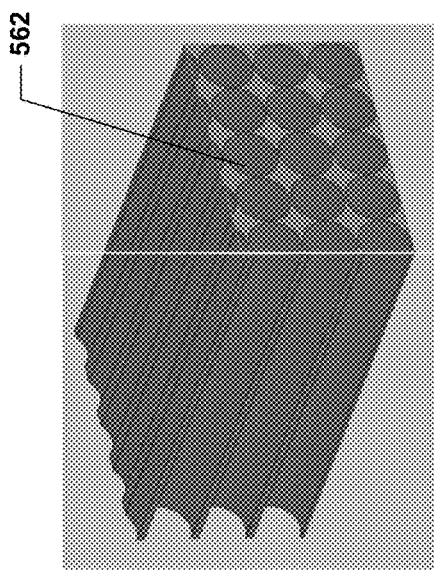

FIGS. 5B-5E illustrate alternate geometries of Cr getters including different size and spacing of gas flow passages (e.g., perforated plates with different passage/hole size and spacing). FIG. 5B illustrates a getter 520 with relatively large gas flow passages 522. FIG. 5C illustrates a getter 540 with smaller gas flow passages 542 that are spaced farther apart than passages 522. FIG. 5D illustrates a getter 560 with medium sized gas flow passages 562 but that are closer together (i.e., there is less substrate between the passages than in getters 520, 540). FIG. 5E illustrates a getter 580 with many small closely spaced gas flow passages 582. The passages may have any suitable diameter, such as a diameter of 1-10 mm, such as 1-4 mm. The substrate may have a thickness of 1-10 cm. While passages with circular cross section are illustrated and described above, it should be noted that the passages may have any other cross sectional shape, such as square, rectangular, oval, triangular, hexagonal, etc.

Furthermore, while passages through the substrate 502 are illustrated and described above, in alternate embodiments, the getter containing passages may instead be located on the substrate (e.g., on the substrate surface along which the air inlet stream passes) and/or in the substrate (e.g., in a groove or recess in the substrate which does not extend all the way through the substrate, such that the air inlet stream passes through the groove or recess on the way to the fuel cell stack) in addition to or instead of the getter containing passages through the substrate. For example, the chromium-getter layer may be coated onto an outer surface of the ceramic baffle plates 302 and/or fuel manifolds 304 and/or fuel inlet or outlet conduits (e.g., tubes) 92, 94 over which the air inlet stream passes on the way to the fuel cell stacks, as shown in FIGS. 3, 4, 6B and 6C. Thus, while the fuel flows inside the fuel manifolds 304 and the fuel tubes 92, the air inlet stream flows along the getter material coated outer surface of the fuel manifolds 304 and/or fuel tubes 92. As shown in FIG. 6B, the fuel tubes 92 contain bellows, such that the getter layer may be located in the bellows grooves and/or on the surface of the bellows ridges. In this embodiment, the ceramic baffle plates 302 and/or fuel manifolds 304 and/or fuel tubes 92, 94 act as the substrate for the chromium getter. It should be noted that any surface of the fuel cell system along which the high temperature air inlet stream passes may be coated with the getter material. Such surfaces include air heat exchanger surfaces, hot box inner surfaces, etc.

In another alternate embodiment, the chromium getter material may be coated onto the fuel cell stack 14 components. For example, for stacks 14 which are externally manifolded for air, as shown in FIGS. 3, 4 and 6A-6C, the chromium getter may be coated on the edges 9A of the interconnects 9 exposed on the side of the stack 14 to the air inlet stream. Alternatively, for internally manifolded for air fuel cell stacks, the chromium getter may be located on the inside surfaces of the air manifolds and/or air riser openings inside the stack.

In other alternate embodiments, the surface of the substrate 502 may be shaped to define at least one gas flow passage in a tortuous path configuration. For example, the substrate 502 may be shaped to define gas flow passages that are bent or winding rather than straight as in the honeycomb configuration. Alternate embodiments may combine honeycomb and tortuous path gas flow passages.

Figure 6A:
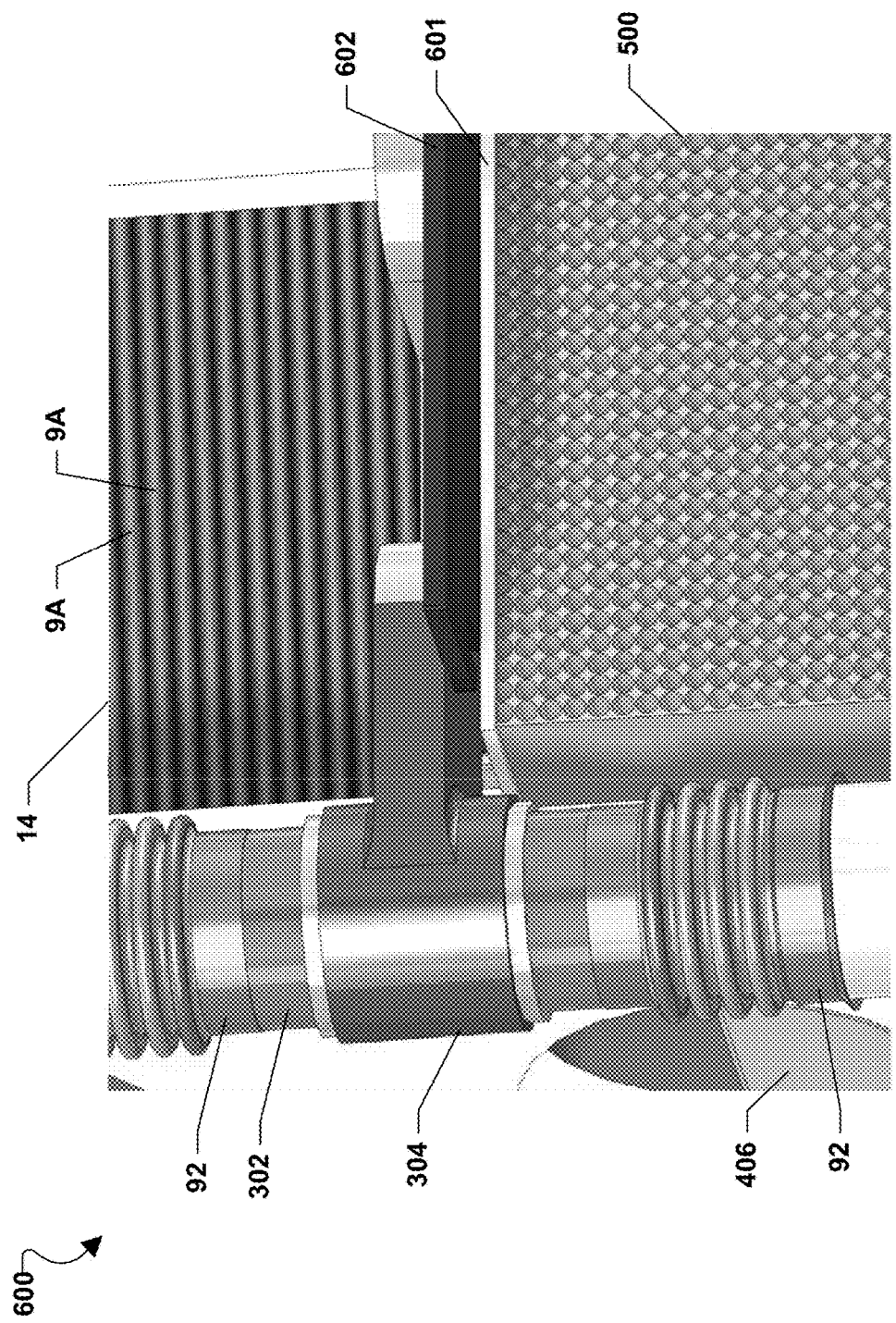
FIGS. 6A-C are various views of an embodiment chromium getter incorporated into a fuel cell assembly.
Figure 6B:
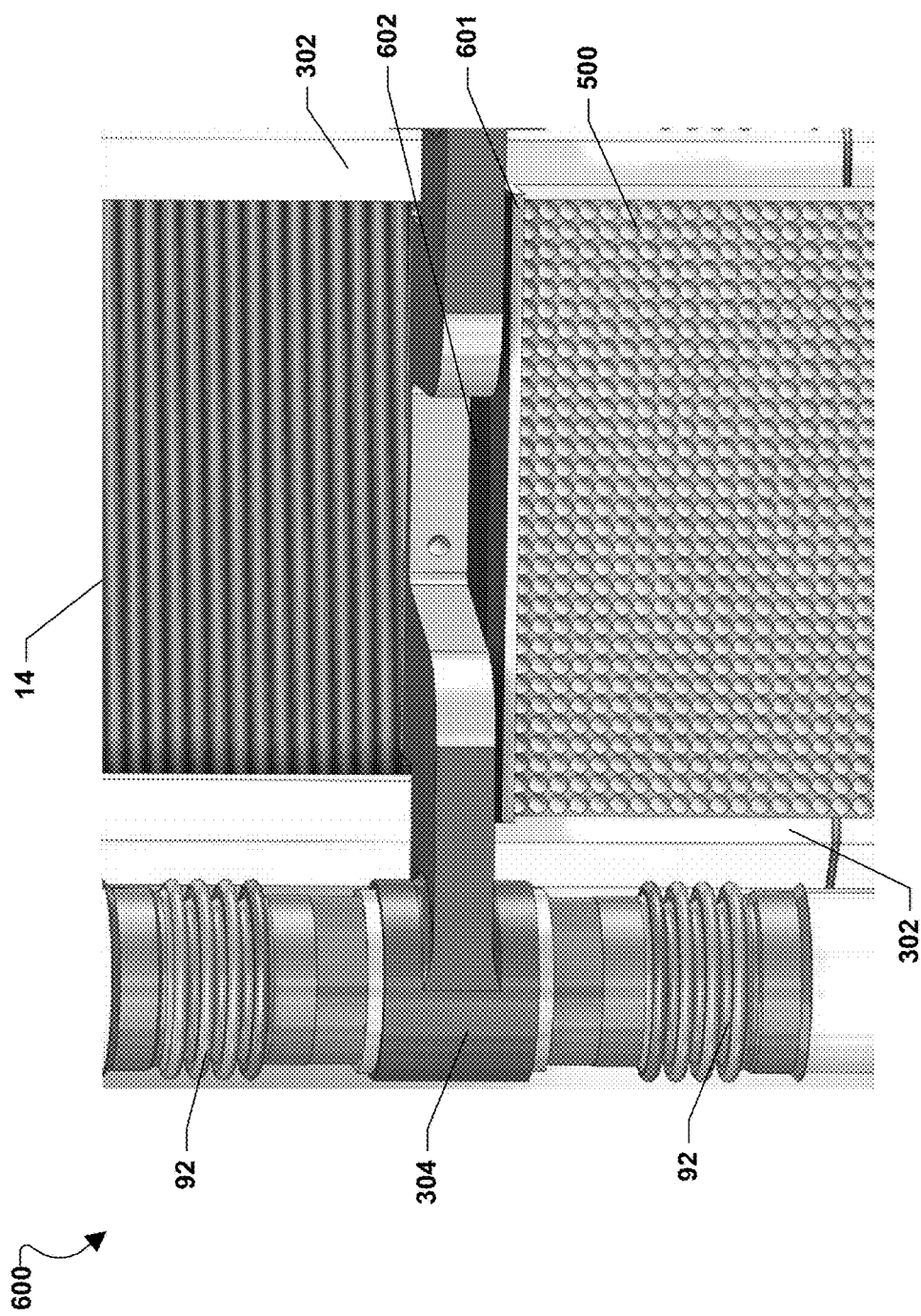

FIG. 6A illustrates a non-limiting example of a fuel cell system 600 incorporating a Cr getter 500. The Cr getter 500 may be positioned in front of the fuel cell stacks 14 which are externally manifolded for air. For example, Cr getters 500 may be secured between fuel manifolds 304 and may be located between the fuel flow tubes 92, 94 connected to the manifolds. The Cr getters 500 may be held in place by ceramic holder plates or clamps 601 which are secured by pins, clips, etc. to the manifolds 304. A flexible shim 602, such as mica or alumina felt, may help hold the Cr getter 500 in place. Oxidizing flow may pass through the Cr getters 500 before reaching the oxidizing flow inlets of interconnects in the fuel cell stacks 14.

Figure 6C:
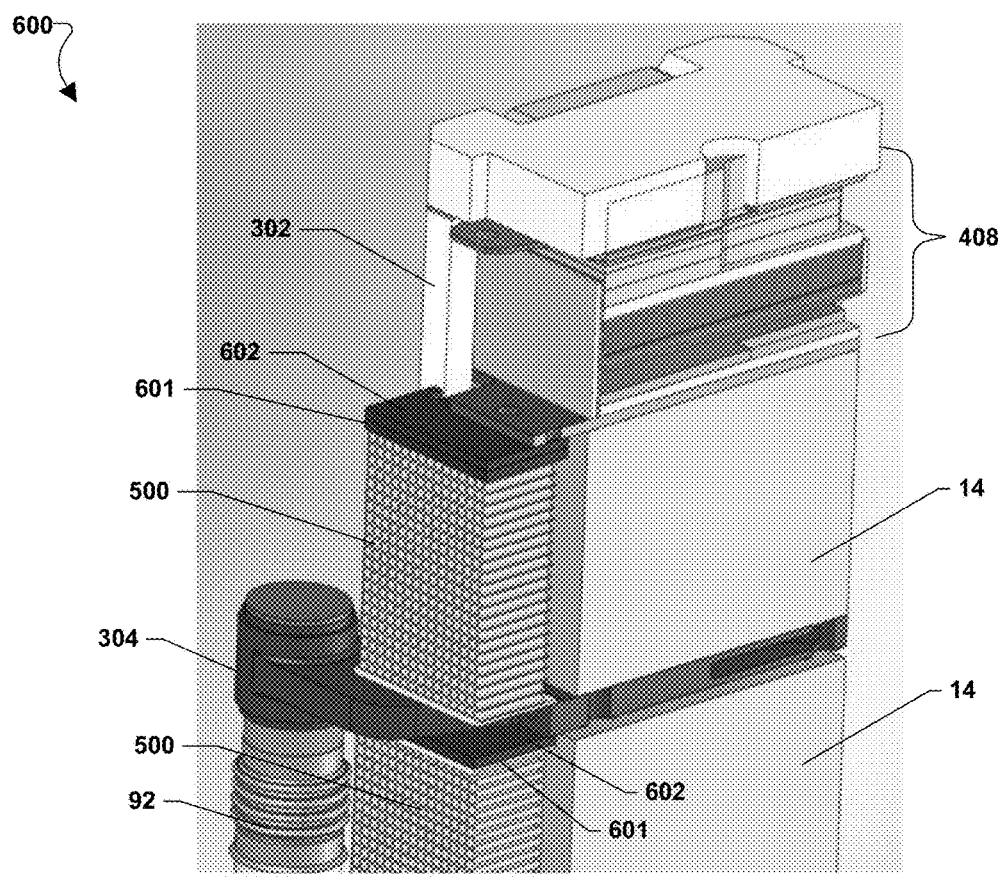

FIG. 6B illustrates the exemplary fuel cell system 600 from another angle. FIG. 6C illustrates a 3D side cut-away view of the top of the exemplary fuel cell system 600 with a Cr getter 500 in place in front of each fuel cell stack 14.

After chromium containing crystals have formed on the chromium-getter material, a fresh Cr getter 500 may be needed. Alternately, the Cr getter 500 may be damaged and need to be replaced. In various embodiments, the Cr getters 500 may be designed to be modular or replaceable for easy maintenance. For example, the flexible shims 602 may be removable to allow a Cr getter 500 to be swapped out during system servicing.

In alternate embodiments, the location of the chromium-getter material may be placed anywhere on, in, or close to the cathode electrode 3 where the stack operating temperature exceeds 500° C. For example, the chromium-getter material may be located on the leading edges of the interconnects of the fuel cell stack which face the air inlet stream, as discussed above. In another example, chromium-getter material may be located over the entire top surface of the cathode, over portions of the surface of the cathode in between points of contact with the interconnect, or mixed into one or more cathode layers.

Preferably, the chromium-getter material has at least one (and preferably both) of a lower electrical conductivity or lower electrochemical activity than a material of the cathode electrode. For example, if the cathode electrode material layer comprises an LSM layer coated on a stabilized zirconia or a doped ceria electrolyte, then the chromium-getter material layer comprises a metal oxide layer containing at least one of Mn, Co and/or Cu (e.g., MCO described below), which has a lower electrical conductivity or a lower electrochemical activity than LSM, such as at least 10% lower (e.g., 10-100% lower) electrical conductivity and electrochemical activity than LSM.

Figure 7A:
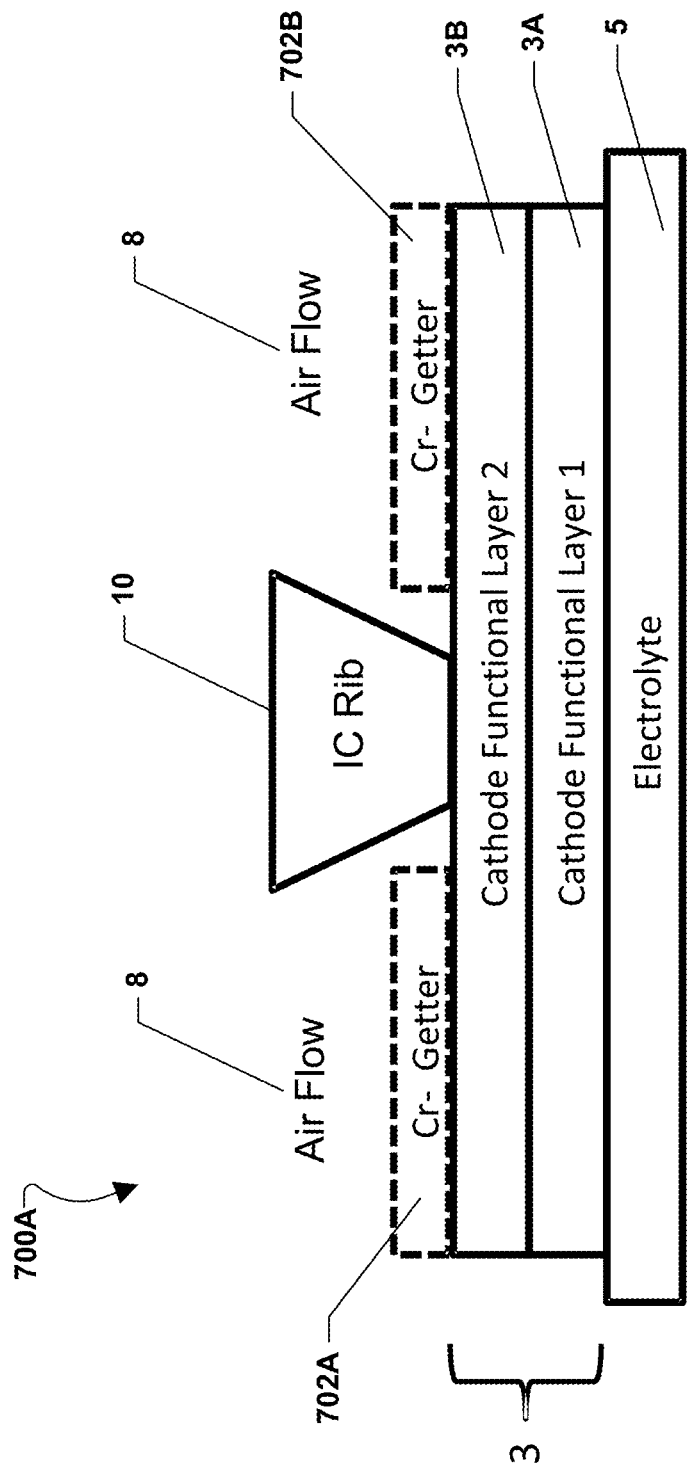
FIGS. 7A-E illustrate alternate placements of chromium-getter material on the cathode electrode of fuel cells.

Various embodiments with alternate placement of the chromium-getter material are illustrated in FIGS. 7A-7E. FIG. 7A illustrates an embodiment of a fuel cell stack 700A with chromium-getter material portions 702a, 702b. A fuel cell may include an electrolyte 5 and a cathode electrode 3, which may include a first functional layer 3a and an optional second functional layer 3b. An interconnect rib 10, as shown in FIG. 1, may contact the cathode electrode 3 between portions 702a, 702b and divide oxidizing gas (e.g., air) flow passages 8. As shown in FIG. 7A, chromium-getter material portions 702a, 702b may be placed on the cathode electrode 3 within the flow passages 8. Thus, the getter material portions are located on the cathode electrode portions that face the air flow passages 8 but not the interconnect ribs 10.

In alternate embodiments, the chromium-getter material portions may face the interconnect ribs 10. For example, the chromium-getter material portions 702a, 702b may be placed on the cathode electrode 3 such that they line up with the interconnect ribs 10 rather than the flow passages 8.

In various embodiments, the chromium-getter material portions may have any shape, such as one or more strips, layers, printed patterns, grids, or meshes. Alternatively, rather than a coating, the chromium-getter material may comprise a separate component or layer, such as a grid or mesh which is located between the interconnect and the cathode.

Figure 7B:
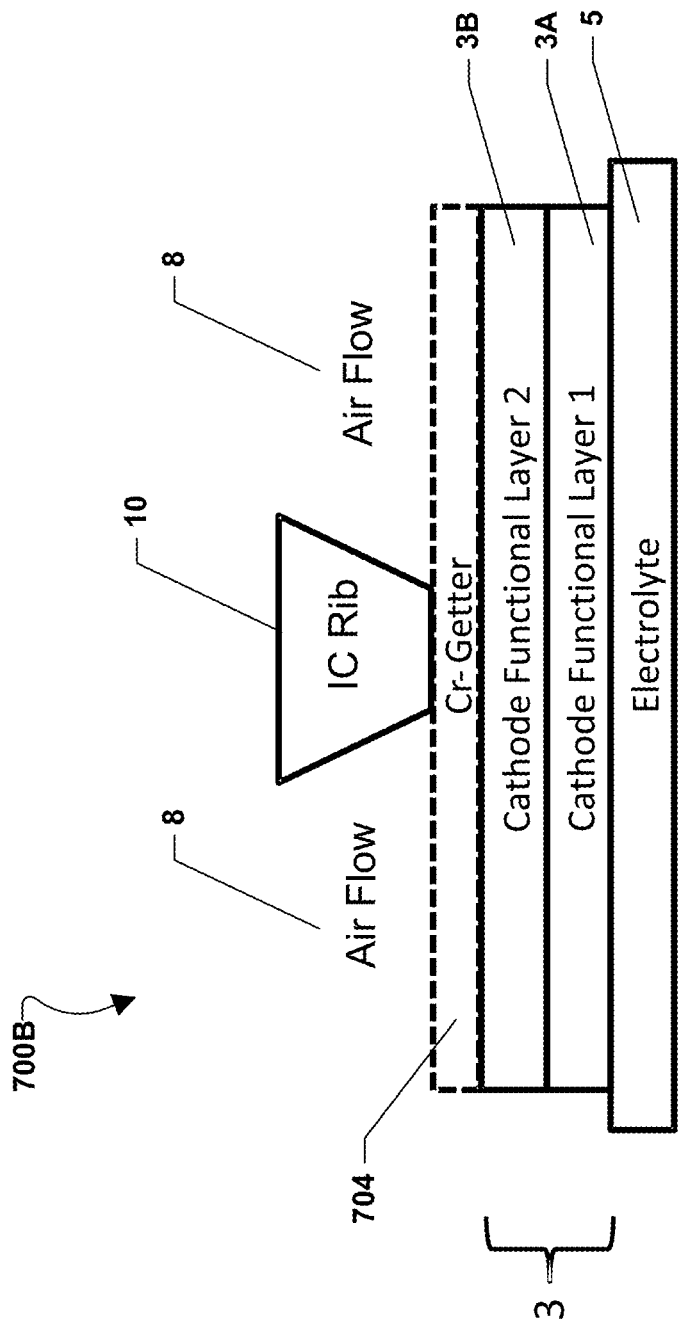
Figure 7C:
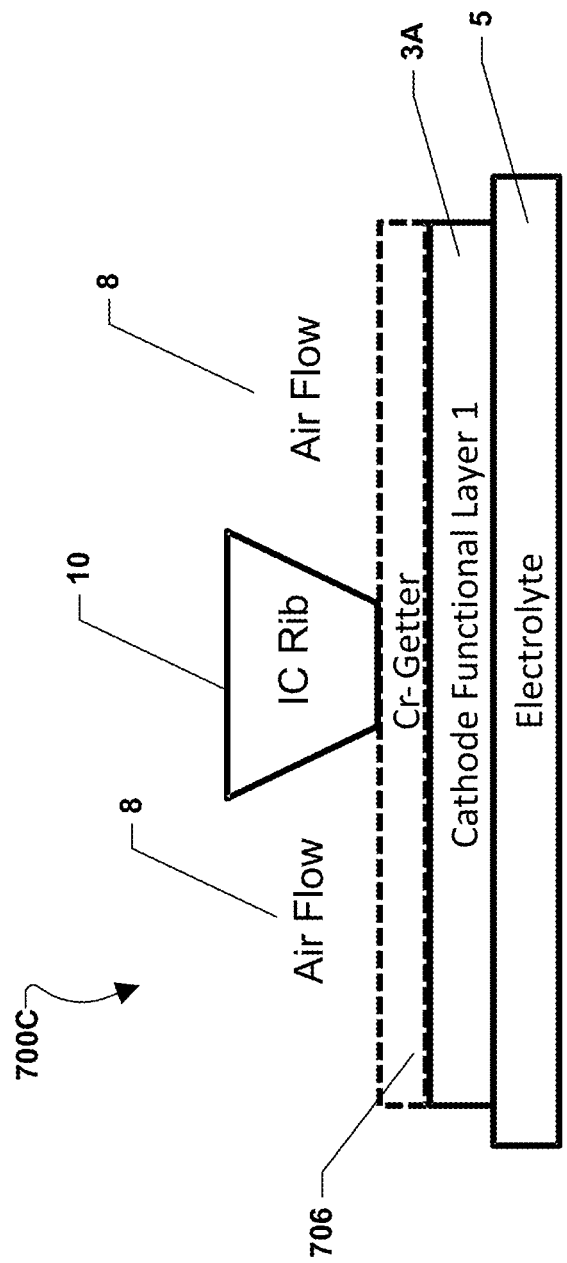

FIG. 7B illustrates an alternate embodiment of a fuel cell stack 700B in which a chromium-getter material layer 704 is placed over the entire cathode electrode 3 with the first functional layer 3a and an optional second functional layer 3b. Alternatively, FIG. 7C illustrates an alternate embodiment of a fuel cell stack 700C in which a chromium-getter material layer 706 is placed over a cathode electrode with a single functional layer 3a. In these embodiments, the chromium-getter material may contact and electrically connect the interconnect rib 10 and the cathode electrode 3.

Figure 7D:
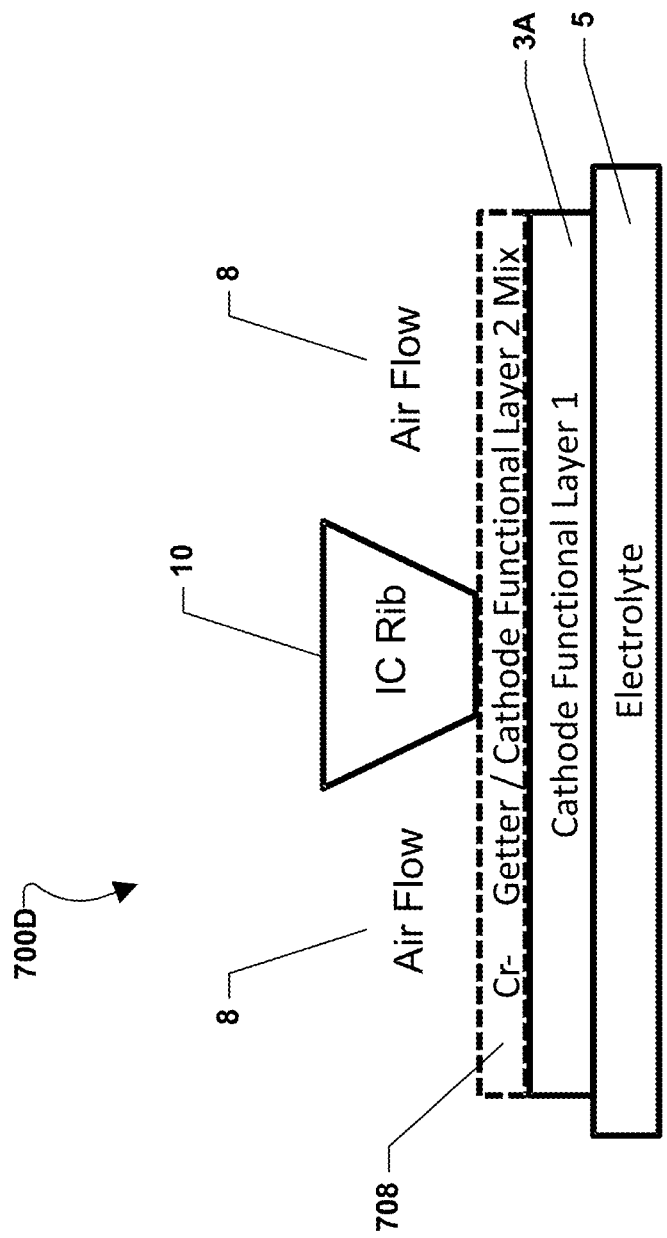

FIG. 7D illustrates an alternate embodiment of a fuel cell stack 700D in which a chromium-getter material is blended with a functional layer of the cathode electrode as a mixed layer 708. The mixed layer 708 is placed over a cathode electrode with a single functional layer 3a. The mixed layer 708 may electrically connect the interconnect rib 10 and the cathode electrode functional layer 3a.

In further embodiments, the chromium-getter material may be mixed with any material, such as an inert material that provides structure, in addition to or instead of being mixed with the cathode material.

Figure 7E:
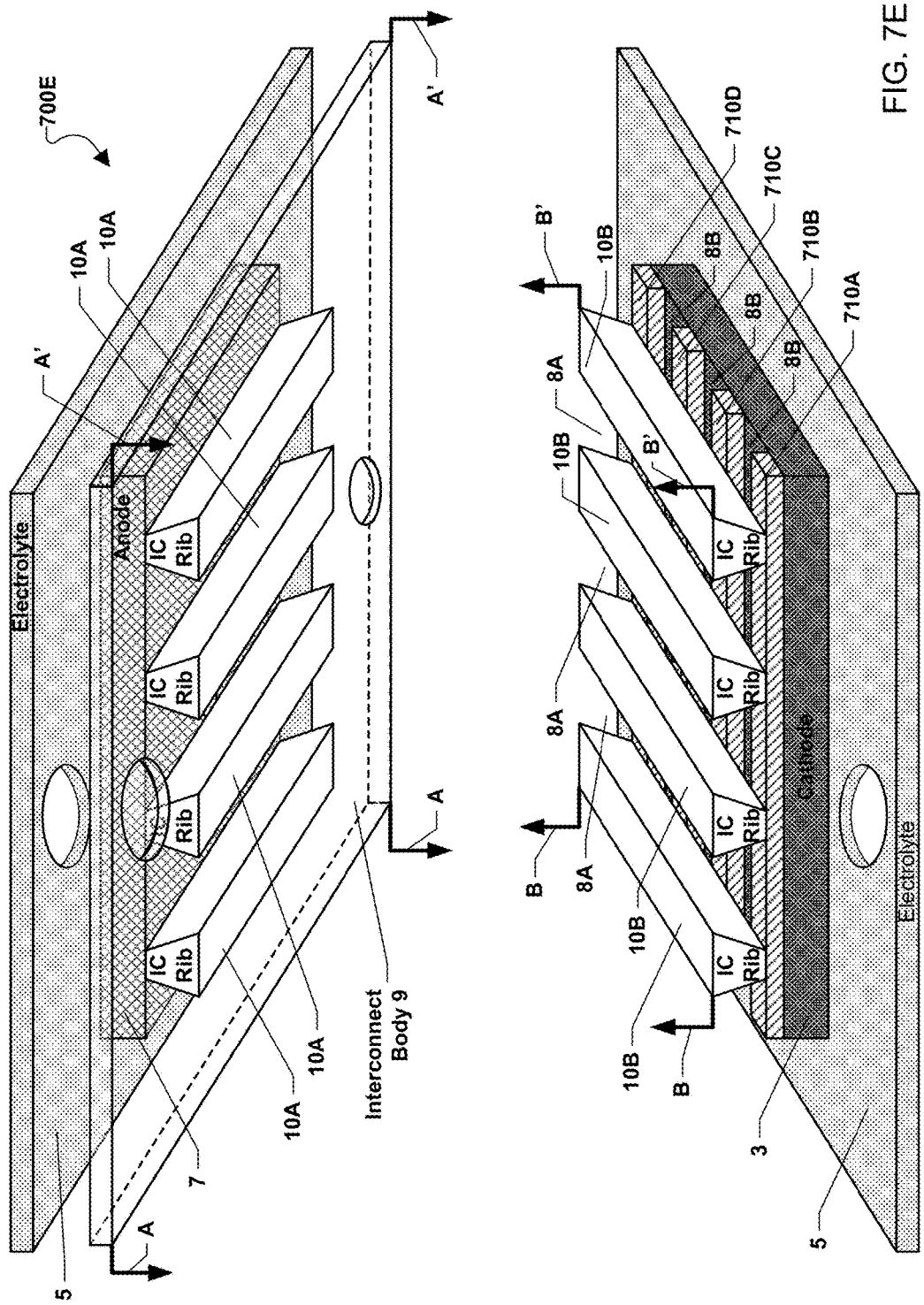

FIG. 7E illustrates an exploded cut away view of an alternative embodiment of a fuel cell stack 700E in which the chromium-getter material is arranged as separate portions over the cathode. The separate portions of chromium-getter material may form contacts strips that are non-parallel to the interconnect ribs placed over the contact strips. The exploded cut away view of FIG. 7E illustrates the respective fuel side 10A and air side 10B interconnect ribs located respectively above and below the plate shaped interconnect body 9 where the cut away view is along lines A-A' and B-B' through a plane between the bottom air side interconnect ribs 10B and the interconnect body 9 and top fuel side interconnect ribs 10A. For illustrative purposes only, the top portion of FIG. 7E shows a transparent interconnect body 9 connected to the top fuel side interconnect ribs 10A as one single piece. The top fuel side interconnect ribs 10A are in contact with the anode 7, which is located on a bottom surface of the top electrolyte 5.

As illustrated, the plurality of chromium-getter contact strips are placed over the cathode 3 as contact strips 710A-710D with air spaced gaps 8B above the cathode and between each contact strip. The contact strips extend longitudinally across the cathode 3 and extend in a non-parallel direction to the bottom air side interconnect ribs 10B which are separated by channels (i.e., gas flow passages 8A). For example, the contact strips may have a length, which extends in a longitudinal direction that is over three times the strip's height or width. In an embodiment, the contact strips 710A-710D may be substantially perpendicular (e.g., within 10 degrees of perpendicular) or perpendicular to the interconnect ribs 10B. Regardless of the relationship between the bottom interconnect ribs 10B and the contact strips 710A-710D, the gas flow passages 8A between the bottom interconnect ribs 10B also extend in a non-parallel, such as substantially perpendicular or perpendicular, direction to the direction in which the gaps 8B extend between adjacent contact strips 710A-710D.

If the contact layer is applied as strips (e.g. lines) or stripes on the cell at a non-zero (e.g., perpendicular) angle to the rib tops, alignment concerns are implicitly eliminated. Based on the intersection of the contact layer pattern (e.g., strips) with the rib tops, periodic contact points will be created.

The contact strips are preferably spaced in a sufficiently narrow manner to provide closely spaced contact points that avoid high in plane resistive losses in the electrode. The strips themselves may be relatively narrow to avoid diffusion losses by gas "shadowing" under the contact strips. The strips are applied tall enough to provide compliance comparable to the topographical variability of the mating components (interconnect rib tops and electrode).

The contact strips may be made by depositing a porous paste on the cathode, which creates a finite diffusion barrier for process gasses traveling to the electrochemically active sites near the electrolyte/electrode interface. The contact paste may be applied by a variety of methods such as screen printing, stencil printing, masked spray painting, bead dispensing, masked curtain coating, etc.

By printing the contact strips on the cathodes, as opposed to on interconnects, any high points on the rib-top of the interconnect will be in contact with the contact strips and the exerted pressure will be distributed rather than concentrated to a single point. In addition, the printing process for contact strips can itself create high points. Again, the contact pressure exerted by this kind of high point will be distributed and reduced by printing the strips on cathodes.

In various embodiments, the chromium-getter material may be on any part of a fuel cell stack, such as a coating on the front of a fuel cell stack (i.e., on the edge surfaces of the interconnects which face the air inlet stream). In further embodiments, the chromium-getter material may be on a fuel cell, such as on a cathode as discussed above and/or on other parts of the fuel cell, such as on an electrolyte. For example, the chromium-getter material may be located on an edge of the electrolyte facing the air inlet stream (i.e., an air inlet conduit or manifold) or on a periphery of a major (flat) surface of the electrolyte upstream of the cathode electrode (i.e., in the peripheral area of the electrolyte not covered by the cathode electrode adjacent to where the air inlet stream enters the stack).

In alternate embodiments, the chromium-getter material may be used in applications other than fuel cell systems. For example, the chromium-getter material may be used in any system which uses chromium containing high temperature alloys, or during manufacturing of chromium containing alloy components. Thus, the chromium-getter material may be used in turbine (or turbine component) manufacturing apparatus, jet engine (or engine component) manufacturing apparatus or chromium plated article (e.g., hubcap) manufacturing apparatus to getter or trap hexavalent chromium.

Various embodiments may use one or more chromium-getter materials. The chromium-getter material may be selected to remove chromium from the oxidizing gas (e.g., air). In various embodiments, the Cr-getter material may include a metal oxide material, such as a ceramic material, for example, a perovskite or spinel ceramic oxide containing any one of, or any combination of the following elements: Mn, Co, Cu, Ni, Fe, Ti, Sc, Al, or La. However, metal oxide materials that have a crystal structure other than perovskite or spinel may be used. Preferably, the metal portions of the metal oxide material comprise one or more of Mn, Co and/or Cu, such as at least 70 atomic percent (e.g., 70-100 at %, including 75-95 at %) of the metal in the metal oxide comprises one or more of Mn, Co and/or Cu. In this manner, Cr can be incorporated into the ceramic oxide structure with sufficient activity to remove Cr from the air inlet stream. The metal oxide layer may be deposited on the substrate as a metal oxide coating by sputtering or other suitable deposition methods. Alternatively, the metal oxide layer may be formed by depositing a metal or metal alloy layer (e.g., Mn, Co and/or Cu) on the substrate by any suitable method, such as sputtering, plating, etc., followed by oxidizing the metal layer in an oxygen containing ambient at an elevated temperature to convert the metal or metal alloy layer to the metal oxide chromium-getter layer.

For example, the Cr-getter material may include lanthanum strontium manganite (LSM), manganese cobalt oxide (MCO), lanthanum strontium cobaltite (LSCo), lanthanum strontium cobalt ferrite (LSCF), and lanthanum strontium ferrite (LSF). Further embodiments may include a Cr-getter material with MCO of the formula $(M1, M2)_3O_4 \pm 0.1$ where M1 comprises at least 70 atomic percent, such as 70-100 at % manganese, and M2 comprises at least 70 atomic percent, such as 70-100 at % cobalt. In other words, the metal in the M1 position on the MCO lattice is at least 70 at % Mn and the metal in the M2 position is at least 70% Co. The MCO spinel may encompass the compositional range from $M1_2M2_1O_{4\pm0.1}$ to $M1_1M2_2O_{4\pm0.1}$. However, other compositional ranges may also be used.

In various embodiments, M1 may include Mn (and unavoidable impurities, if any) and M2 may include Co (and unavoidable impurities, if any) and the spinel is stoichiometric (i.e., the metal to oxygen atomic ratio is 3:4). In one embodiment, the MCO spinel encompasses the compositional range from $Mn_2CoO_4$ to $Co_2MnO_4$. That is, any spinel having the composition $Mn_{2-x}Co_{1+x}O_4 (0 \leq x \leq 1)$ or written as $z(Mn_3O_4)+(1-z)(Co_3O_4)$, where $(1/3 \leq z \leq 2/3)$ or written as $(Mn, Co)_3O_4$ may be used.

In various embodiments, the spinel composition contains at least 25 atomic percent of cobalt oxide, such as 25 to 60 atomic percent cobalt oxide. Another way to phrase this is that the atomic ratio of Co to Mn in the spinel may be at least 1:3, such as 1:3 to 6:4, preferably 1:1. Thus, the spinel composition may be $Mn_{1.5}Co_{1.5}O_4$ which comprises 50 atomic percent manganese oxide and fifty atomic percent cobalt oxide.

In alternate embodiments, the chromium-getter material may comprise a binary oxide, such as a manganese oxide or a cobalt oxide. For example, the material may have any manganese oxide composition ranging between $MnO_2$ and $Mn_3O_4$ (e.g., $Mn_xO_4$, where $1 \leq x \leq 1.5$). Alternatively, the material may have any cobalt oxide composition ranging between $Co_2O_3$ and $Co_3O_4$ (e.g., $Mn_xO_{12}$, where $8 \leq x \leq 9$).

In various embodiments, the Cr-getter material coatings and layers may have any suitable thickness greater than zero, such as 20 to 100 microns, preferably greater than 20 microns, such as 25 to 40 microns.

Figure 8:
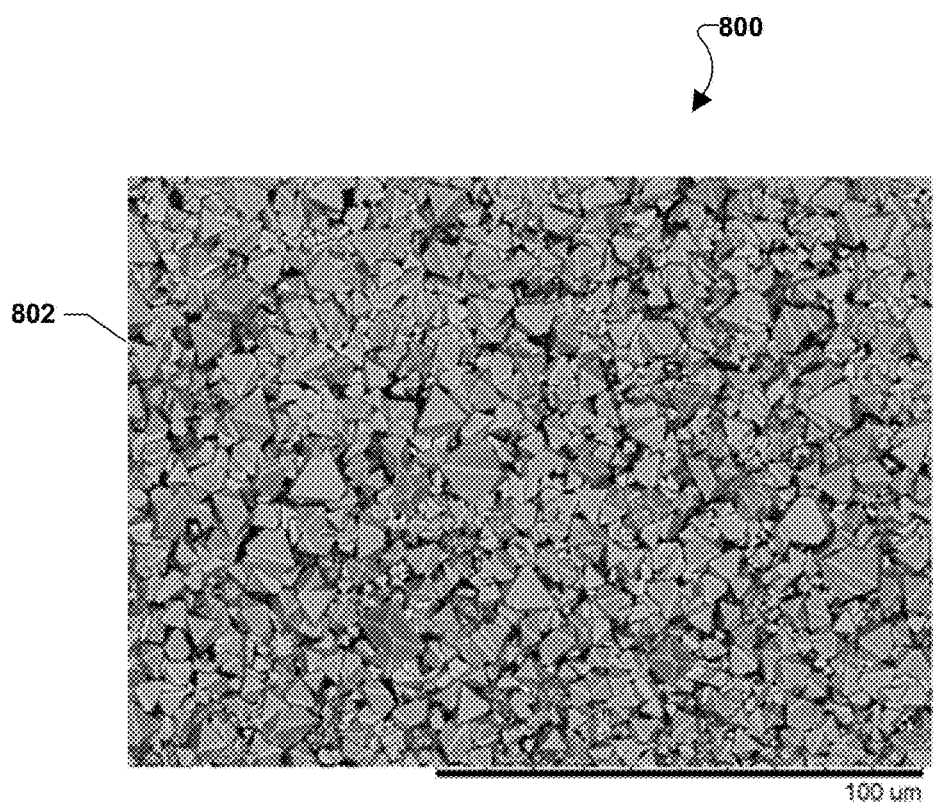
FIG. 8 is a micrograph of the resulting crystallized surface after an oxidizing flow containing $CrO_2(OH)_2$ was passed over an embodiment chromium getter surface.

Various embodiments may include a Cr-getter material with a $Mn_{1.5}Co_{1.5}O_4$ spinel composition on an alumina substrate. For example, an oxidizing flow (e.g., humid air) containing $CrO_2(OH)_2$ was passed over the $Mn_{1.5}Co_{1.5}O_4$ surface and it was observed that $(Mn,Co,Cr)_3O_4$ faceted crystals formed on the surface, typical of a vapor to solid phase transformation. FIG. 8 shows a micrograph of the resulting crystallized surface 802.

Figure 9:
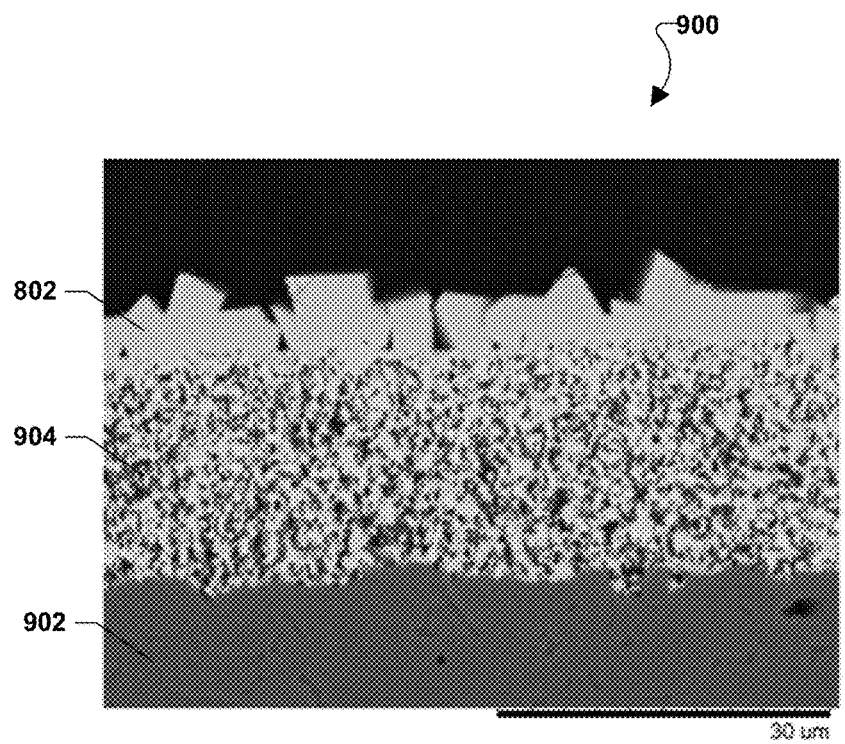
FIG. 9 illustrates a cross-sectional scanning electron microscope (SEM) image of the surface crystals of FIG. 8.

FIG. 9 shows a cross-sectional scanning electron microscope (SEM) image of the surface crystals 802. Energy-dispersive X-ray spectroscopy (EDS) was used to confirm the composition of the top layer to be $(Mn,Co,Cr)_3O_4$, showing Cr absorption and incorporation at the surface of the MCO. Because there was no Cr in the alumina substrate 902 or original MCO coating 904, the Cr observed in the surface crystals 802 could only have come from the air stream.

Any feature of any embodiment described above can be used in any combination with any one or more features of any one or more embodiments described above. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell stack, comprising:
   solid oxide fuel cells that comprise:
   an electrolyte;
   a cathode electrode having an outer surface and an opposing an inner surface disposed on a first side of the electrolyte;
   an anode electrode disposed on a second side of the electrolyte; and
   a chromium-getter material arranged in separate strips that are each disposed directly on the outer surface of the cathode electrode, such that portions of the outer surface are exposed between the strips; and
   interconnects comprising interconnect ribs that at least partially define gas flow passages, the interconnects being disposed between the fuel cells, such that the chromium-getter material is disposed directly between the outer surface of each cathode electrode and a corresponding interconnect, wherein the ribs contact portions of the cathode electrode exposed by gaps between the strips of the chromium-getter material.

2. The fuel cell stack of claim 1, wherein the strips of the chromium-getter material align with the gas flow passages.

3. The fuel cell stack of claim 1, wherein the strips of the chromium-getter material comprise contact strips located between the cathode electrode and the interconnect ribs.

4. A fuel cell stack, comprising:
   solid oxide fuel cells that comprise:
   an electrolyte;
   a cathode electrode having an outer surface and an opposing an inner surface disposed on a first side of the electrolyte;
   an anode electrode disposed on a second side of the electrolyte; and
   a chromium-getter material arranged in separate strips that are each disposed directly on the outer surface of the cathode electrode, such that portions of the outer surface are exposed between the strips; and
   interconnects comprising interconnect ribs that at least partially define gas flow passages, the interconnects being disposed between the fuel cells, such that the chromium-getter material is disposed directly between the outer surface of each cathode electrode and a corresponding interconnect, wherein the ribs contact portions of the cathode electrode exposed by gaps between the strips of the chromium-getter material;

wherein the strips of the chromium-getter material comprise contact strips located between the cathode electrode and the interconnect ribs; and wherein the contact strips are non-parallel to the interconnect ribs.

5. The fuel cell stack of claim 4, wherein the contact strips are at least one of substantially perpendicular or perpendicular to the interconnect ribs.

6. A fuel cell, comprising:
an electrolyte;
a cathode electrode having an outer surface and an opposing an inner surface disposed on a first side of the electrolyte;
an anode electrode disposed on a second side of the electrolyte; and
a chromium-getter material disposed on the outer surface of the cathode electrode and arranged in a mesh or grid configuration.

7. The fuel cell of claim 6, wherein the chromium-getter material has at least one of a lower electrical conductivity or lower electrochemical activity than a material of the cathode electrode, and is selected from at least one of LSM, MCO, LSCo, LSCF, and LSF.

8. The fuel cell of claim 6, wherein the mesh or grid consists of the chromium-getter material.

9. The fuel cell stack of claim 1, wherein the separate strips consist of the chromium-getter material.

10. The fuel cell stack of claim 1, wherein the chromium-getter material has at least one of a lower electrical conductivity or lower electrochemical activity than a material of the cathode electrode, and is selected from at least one of LSM, MCO, LSCo, LSCF, and LSF.

* * * * *